United States Patent
Marupaduga

(10) Patent No.: US 11,297,553 B1
(45) Date of Patent: Apr. 5, 2022

(54) SERVING ACCESS NODE SELECTION TO ENSURE UPLINK SERVICE

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 63 days.

(21) Appl. No.: 16/992,345

(22) Filed: Aug. 13, 2020

(51) Int. Cl.
*H04W 36/24* (2009.01)
*H04W 36/34* (2009.01)

(52) U.S. Cl.
CPC ........... *H04W 36/24* (2013.01); *H04W 36/34* (2013.01)

(58) Field of Classification Search
CPC ............................... H04W 36/24; H04W 36/34
See application file for complete search history.

(56) References Cited

U.S. PATENT DOCUMENTS

| 7,928,909 | B2 | 4/2011 | Jung et al. |
| 9,173,178 | B2 | 10/2015 | Chakraborty et al. |
| 2014/0370882 | A1* | 12/2014 | Liu ........................ H04W 88/06 455/422.1 |
| 2018/0324714 | A1* | 11/2018 | Yang ...................... H04W 72/10 |
| 2018/0352481 | A1* | 12/2018 | Taguchi .............. H04W 36/023 |
| 2019/0021085 | A1* | 1/2019 | Mochizuki ........ H04W 72/0446 |
| 2020/0107215 | A1* | 4/2020 | Lee ....................... H04W 40/04 |

\* cited by examiner

*Primary Examiner* — Hashim S Bhatti

(57) ABSTRACT

Methods, systems, and processing nodes for ensuring uplink service for wireless devices capable of uplink split mode in EN-DC using both 4G LTE and 5G NR RATs, by selecting serving access nodes that are also capable of uplink split mode and/or coupled to large quantities of antenna elements relative to other potential serving access nodes. In particular, such serving access nodes are selected for wireless devices that exhibit one or more of a low power headroom, a high uplink buffer, or a high mobility.

19 Claims, 7 Drawing Sheets

DETERMINE THAT WIRELESS DEVICE CAPABLE OF UPLINK SPLIT MODE HAS A LOW POWER HEADROOM, A HIGH BUFFER, OR A THRESHOLD MOBILITY
610

INSTRUCT WIRELESS DEVICE TO ATTACH TO ACCESS NODE HAVING A RELATIVELY HIGHER AMOUNT OF ANTENNA ELEMENTS
620

SERVING ACCESS NODE SELECTION TO ENSURE UPLINK SERVICE

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. In other cases, a combination of transceivers and antennae may be used by access nodes and wireless devices to simultaneously communicate using both 4G and 5G RATs, using transmissions methods known as "concurrent mode", or "split mode" (wherein a single antenna element can be used for both 4G LTE and 5G NR transmissions). A split mode antenna array operating at an access node is thus capable of simultaneously communicating using two different communication protocols. By dividing the antenna array into a first node and second node and supplying the nodes with a common power supply, the access node can wirelessly communicate with devices according to both protocols without increasing overall power consumption and reducing the need for additional equipment on costly real estate. As throughput and connectivity are positively correlated with power output, the split mode antenna array can control throughput and connectivity on each protocol by allocating power between the two nodes.

Further, as wireless device technology improves, increasing numbers of wireless devices are using higher transmit powers to transmit uplink data. For example, uplink MU-MIMO is a new service that applies MIMO technology to transmitting uplink data using a plurality of layers or streams. Therefore, access nodes may further be capable of utilizing "uplink split mode", enabling wireless devices to transmit large amounts of uplink data using both 4G and 5G RATs. However, transitioning to these advanced technologies in today's heterogenous wireless networks can be associated with problems. In particular, as heterogeneous wireless networks include various combinations and types of access nodes with different capabilities, balancing of wireless devices and their capabilities between neighboring access nodes can be problematic, particularly when the capabilities of the access node and the wireless devices do not match. For example, wireless devices that have high uplink data requirements may not be well-served by access nodes that are not capable of uplink split mode. Further, wireless devices with high mobility or low power headroom may be subject to frequent handovers between access nodes that are not equipped to provide consistent and reliable uplink connections.

OVERVIEW

Exemplary embodiments described herein include methods, systems, and processing nodes for ensuring uplink service for wireless devices capable of uplink split mode, by selecting serving access nodes that are also capable of uplink split mode and/or coupled to large quantities of antenna elements relative to other potential serving access nodes. In particular, such serving access nodes are selected for wireless devices that exhibit one or more of a low power headroom, a high uplink buffer, or a high mobility. Particularly in heterogeneous networks, these operations enable consistent uplink service while minimizing unnecessary handovers.

An exemplary method for selecting a serving access node for wireless devices in a heterogeneous network includes determining that a wireless device capable of utilizing uplink split mode is associated with one or more of a low power headroom, a high buffer, or a threshold mobility, and selecting the serving access node for the wireless device based on a capability of the serving access node to utilize uplink split mode. The capability of the serving access node to utilize uplink split mode can be based on the serving access node comprising a quantity of antenna elements that is either greater than a threshold quantity of antenna elements or is relatively higher than antenna elements coupled to other potential serving access nodes in the heterogeneous network.

Thus, another exemplary method for selecting a serving access node or ensuring uplink service can include determining that a wireless device capable of utilizing uplink split mode is associated with a low power headroom, and selecting a serving access node for the wireless device that has an antenna configuration, or relatively large quantity of antennae, to support split mode.

Similarly, an exemplary method for selecting a serving access node or ensuring uplink service can include determining that a wireless device capable of utilizing uplink split mode is associated with a high buffer, and selecting a serving access node for the wireless device that has an antenna configuration, or relatively large quantity of antennae, to support split mode.

Similarly, an exemplary method for selecting a serving access node or ensuring uplink service can include determining that a wireless device capable of utilizing uplink split mode is associated with a threshold mobility, and selecting a serving access node for the wireless device that has an antenna configuration, or relatively large quantity of antennae, to support split mode.

In an exemplary embodiment, a method for selecting a serving access node comprises adjusting handover thresholds to encourage or discourage wireless devices to be handed over to the serving access node based on the antenna configuration of the serving access node. The method includes performing a handover of split-mode capable wireless devices from a first serving access node having a relatively lower quantity of antenna elements to a second serving access node with relatively higher quantity of antenna elements.

In another exemplary embodiment, a method for selecting a serving access node for a split-mode capable wireless device includes determining that the split-mode capable wireless device has a mobility that exceeds a threshold, and selecting a serving access node that is capable of split mode, wherein such access nodes capable of split mode have sufficient antennae to cover a large area, thereby reducing handovers.

Another exemplary method for ensuring uplink service includes identifying a plurality of access nodes serving a common coverage area, the plurality of access nodes being capable of utilizing uplink split mode, and instructing wireless devices within the common coverage area and reporting a low power headroom and a high buffer status to attach to an access node that has a comparatively higher quantity of antenna elements relative to other access nodes from the plurality of access nodes.

An exemplary system for selecting an access node for ensuring uplink service for wireless devices capable of utilizing uplink split mode includes a first access node that is incapable of simultaneously receiving uplink data via at least two different radio access technologies, a second access node adjacent the first access node, the second access node being capable of simultaneously receiving uplink data via the at least two different radio access technologies, and a processing node communicatively coupled to at one or both of the first and second access nodes. The processing node is configured to perform operations including identifying wireless devices within range of both first and second access nodes and being associated with a high uplink buffer or a low power headroom, and selecting the second access node as a serving access node for the wireless devices based on the second access node being capable of simultaneously receiving uplink data via the at least two different radio access technologies. The at least two different radio access technologies comprise 4G long-term evolution (LTE) and 5G new radio (NR). The first access node is incapable of simultaneously receiving the uplink data via the at least two different radio access technologies based on the first access node being coupled to a quantity of antenna elements that is below a threshold quantity, and the second access node is capable of simultaneously receiving the uplink data via the at least two different radio access technologies based on the second access node being coupled to a quantity of antenna elements that is above a threshold quantity.

Thus, in an exemplary embodiment, a system for selecting a serving access node for wireless devices capable of utilizing uplink split mode includes a first access node having a first quantity of antenna elements, a second access node sharing a common coverage area with the first access node, the second access node having a second quantity of antenna elements that is higher than the first quantity of antenna elements, and a processing node communicatively coupled to one or both of the first and second access nodes. The processing node is configured to perform operations including identifying a wireless device in the common coverage area and reporting a low power headroom and a high buffer status report, and instructing the wireless device to attach to the second access node.

DETAILED DESCRIPTION

Figure 1:
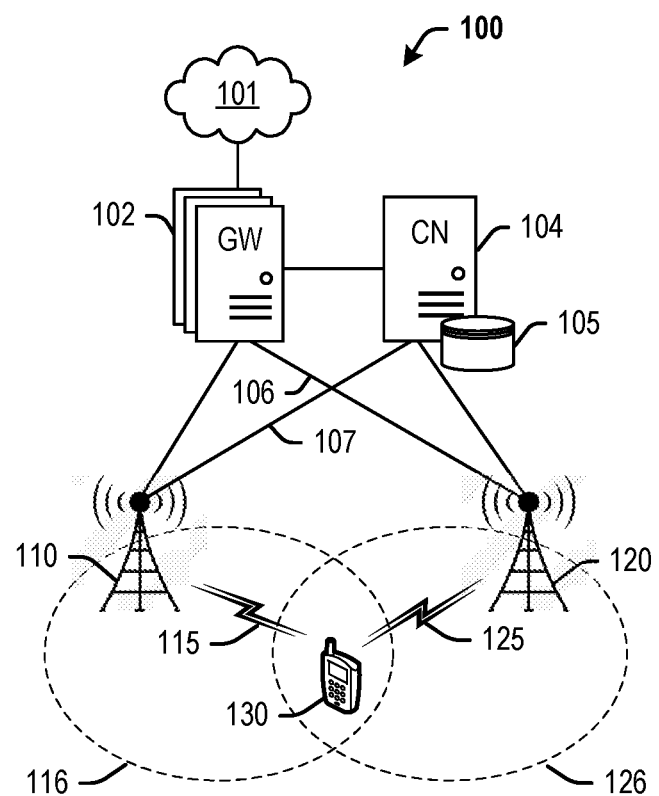
FIG. 1 depicts an exemplary system for selecting access nodes to ensure uplink service for wireless devices capable of uplink split mode.

The following disclosure provides methods and systems for selecting serving access nodes for a wireless device so as to ensure reliable uplink service, based on whether the serving access nodes are capable of or enabled to perform uplink split mode, and based on whether the wireless device's uplink usage requirement or signal conditions meet a threshold. Uplink split mode (also known as concurrent mode) enables the wireless device to transmit uplink data via at least two carriers simultaneously, such as via 4G LTE and via 5G NR, which enables greater uplink throughput. Further, the uplink usage requirement of the wireless device can be indicated by a high uplink buffer, and the signal conditions may be indicated by a low power headroom, or a high mobility. Therefore, such wireless devices capable of split mode in 5G EN-DC systems can be provided with reliable uplink service. Access nodes capable of split mode can be determined based on a quantity of antennae or antenna elements of the access node. For example, an access node with 64 transmit and 64 receive (64T/64R) antenna elements may have sufficient antenna elements to enable uplink split mode, while access nodes with 8 transmit and 8 receive (8T/8R) antenna elements may not have sufficient antenna elements to be able to utilize uplink split mode.

Further, radiofrequency (RF) conditions are balanced with the need for greater uplink throughput. For example, when a wireless device with a high uplink usage requirement, a low power headroom, or a high mobility, that is currently attached to an access node capable of uplink split mode experiences poor RF signal conditions, the wireless device is discouraged from requesting a handover to a neighboring access node that does not support uplink split mode, at least until an adjusted handover threshold is reached. In other words, the wireless device with a high uplink usage and/or a low power headroom is encouraged (via handover threshold adjustment) to stay attached to access nodes capable of uplink split mode, despite RF signal conditions deteriorating beyond typical thresholds. Similarly, wireless devices with high uplink usage and/or low power headroom can be encouraged to request attachment to access nodes that support uplink split mode, based on handover threshold adjustments. The thresholds may be defined by a network operator and can be dynamically adjusted based on overall uplink throughput and availability of different access nodes in the heterogeneous network. Particularly in heterogeneous networks, these operations enable consistent uplink service while minimizing unnecessary handovers.

Therefore, as described herein, a processing node (communicably coupled to, for example, an access node) is configured to perform operations including determining that a wireless device capable of utilizing uplink split mode is associated with one or more of a low power headroom, a high buffer, or a threshold mobility, and selecting the serving access node for the wireless device based on a capability of the serving access node to utilize uplink split mode. The capability of the serving access node to utilize uplink split mode can be based on the serving access node comprising a quantity of antenna elements that is either greater than a threshold quantity of antenna elements or is relatively higher than antenna elements coupled to other potential serving access nodes in the heterogeneous network. Exemplary access nodes described herein can communicate using a plurality of wireless air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different wireless air interface using a different frequency. For example, each antenna element can be configured to deploy a 4G LTE air interface or a 5G NR air interface. Different quantities of antenna elements can be configured to deploy (or "assigned" to) a different type of wireless air interface, depending on the needs of a network operator or users. Further, in split mode or "concurrent mode", individual antenna elements can be configured to simultaneously deploy at least two different wireless air interfaces using two different RATs, which enables the aforementioned wireless devices with high uplink usage to transmit uplink data via each of the at least two RATs simultaneously. Thus, while access nodes that are not capable of utilizing uplink split mode may use the 4G LTE RAT for control transmissions and the 5G NR RAT for data transmissions, access nodes capable of uplink split mode can receive uplink data via both 4G LTE and 5G NR RATs. In an exemplary embodiment, a gNodeB portion of a radio access network (RAN) is configured with logic to determine a transmission path for data packets traversing the radio access network. The transmission paths can traverse different RATs, as well as different ports of a cell site router coupled to the 4G eNodeB and 5G gNodeB.

Further, preventing or encouraging handovers of the wireless device comprises adjusting handover thresholds. A signal quality reported by the wireless device is monitored, wherein the handover thresholds are adjusted such that the signal quality does not deteriorate past a threshold. For example, if a potential serving access node cannot provide adequate uplink service (e.g. is not enabled with uplink split mode), then a handover threshold associated with the potential serving access node is raised, such that a handover of the wireless device to the potential serving access node is prevented or discouraged. Adjusting the handover threshold may include increasing or raising a threshold signal level associated with the potential serving access node. The adjustment may further comprise decreasing or lowering a threshold signal level of a current serving access node, such that the wireless device remains attached to the current serving access node for a longer time. Alternatively, or in addition, if a potential serving access node is capable of uplink split mode, then a handover threshold of the potential serving access node is lowered, such that a handover of the wireless device to the potential serving access node is performed or encouraged. Adjusting the handover threshold may include decreasing or lowering a threshold signal level associated with the potential serving access node. The adjustment may further comprise increasing or raising a threshold signal level of the current serving access node, such that the wireless device is triggered to detach from the current serving access node sooner. These adjusted handover thresholds can be transmitted to wireless devices that exhibit high uplink buffers, low power headroom, and high mobility, thereby ensuring adequate uplink service of such wireless devices and preventing unnecessary handovers between different access nodes in heterogeneous networks.

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-10.

FIG. 1 depicts an exemplary system 100 comprising a communication network 101, gateway 102, controller node 104, access nodes 110, 120, and wireless device 130. In this exemplary embodiment, each of access nodes 110, 120 may be configured to deploy at least two wireless air interfaces 115, 125, over coverage areas 116, 126 respectively. Each wireless air interface may be configured to utilize at least two different frequency bands or sub-bands, with different channel sizes or bandwidths, and so on. For example, each wireless air interface 115, 125 can be configured to utilize both 4G LTE and 5G NR RATs, with the 5G NR wireless air interface configured to utilize higher frequencies and larger channel bandwidths than the 4G LTE wireless air interface. Further, at least one of access nodes 110, 120 can be configured to communicate using both RATs at the same time in what is referred to as "concurrent mode" or "split mode". For example, antenna elements coupled to access node 110 can be configured to simultaneously communicate using 4G LTE and 5G NR. This ability of access node 110 to utilize split mode may be based on a quantity of antenna elements of access node 110. For example access node 110 may have a 64T/64R antenna configuration, enabling a portion of the antenna elements to be configured to utilize split mode, without negatively affecting service quality. Whereas, access node 120 may have a smaller antenna configuration (e.g. 8T/8R or 16T/16R antenna elements), and thus is configured to utilize only 5G EN-DC, whereby dual connections are initiated with wireless devices using both 4G and 5G wireless air interfaces, the 4G wireless air interface being used to transmit control information, and the 5G wireless air interface being used to transmit data information. Thus, access node 120 is not configured to utilize uplink split mode. Although only access nodes 110, 120 and wireless device 130 is illustrated in FIG. 1, system 100 can include various other combinations of carriers/wireless air interfaces, antenna elements, access nodes, and wireless devices, as may be evident to those having ordinary skill in the art in light of this disclosure. Additional combinations and permutations of reductions may be envisioned by those having ordinary skill in the art in light of this disclosure. Further, while 4G LTE and 5G NR are described in the above embodiments, the disclosed operations may apply to different combinations of wireless air interfaces, including any combination of wireless air interfaces within the same or different radio-access technologies, such as multiple different 4G carriers, 5G carriers, or any future wireless technology.

In an exemplary embodiment, wireless device 130 may exhibit a need or requirement for consistent uplink service, based on, for example, a high uplink buffer status, a low power headroom, or a high mobility. In an exemplary embodiment, the wireless device 130 may report an uplink buffer amount that exceeds a threshold, via for example a buffer status report (BSR). Further, the wireless device 130 may be associated with a low power headroom, determined via a power headroom report (PHR). The wireless device may be associated with a high mobility, determined via a location, or a threshold number of handover requests within a time period. In either case, a processing node (communicably coupled to, for example, access node 110) is configured to perform operations including determining that wireless device 130 is capable of utilizing uplink split mode and is associated with one or more of a low power headroom, a high buffer, or a threshold mobility, and selecting the serving access node from among potential serving access nodes 110, 120 based on a capability of the serving access node to utilize uplink split mode. The capability of the serving access node 110, 120 to utilize uplink split mode is based on having a quantity of antenna elements that is either greater than a threshold quantity of antenna elements or is relatively higher than antenna elements coupled to other potential serving access nodes in the heterogeneous network. The threshold quantity of antenna elements comprises any one of 32×32 transmit and receive antennae (32T/32R), 64×64 transmit and receive antennae (64T/64R), or 128×128 transmit and receive antennae (128T/128R). In an exemplary embodiment, having a threshold quantity of antenna elements enables configuring an access node for uplink (or downlink) split mode, since there are sufficient antenna elements that utilizing a portion of the antenna elements for split mode does not negatively impact other dedicated transmission modes such as solely downlink or solely uplink.

Determining that the wireless device 130 is associated with the high buffer is based on a buffer status report received from the wireless device. The buffer status report can indicate that an uplink buffer of the wireless device meets a threshold size. Further, determining that the wireless device is associated with the low power headroom is based on a power headroom report (PHR) being below a threshold. Further, determining that the wireless device is associated with the threshold mobility is based on frequency of handovers of the wireless device, or a location of the wireless device. Each of these thresholds can be based on a time period. For example, determining that the wireless device is associated with the high buffer is based on an uplink buffer of the wireless device meeting a threshold size over a time period. Further, determining that the wireless device is associated with the low power headroom is based on a power headroom report (PHR) being below a threshold over a time period. Further, determining that the wireless device is associated with the threshold mobility is based on frequency of handovers of the wireless device over a time period. Further, these operations can be triggered based on a determination that wireless device 130 is in a heterogeneous network. This determination can be based on any combination of a master information block (MIB) message transmitted by any of access nodes 110, 120, as well as an antenna configuration of each potential serving access node 110, 120 in the heterogeneous network. For example, a new or unique information element (IE) can be defined and incorporated within the MIB message to indicate that a serving access node is part of the heterogeneous network. Alternatively or in addition, a combination of one or more primary cell identifiers (PCIs) detected by, for example, a search report from the wireless device, can be used to determine that the wireless device is in a heterogeneous network, in combination with antenna configurations in each MIB.

In an exemplary embodiment, the wireless device 130 is attached to a first serving access node (e.g. access node 110), and ensuring consistent uplink service can include adjusting handover thresholds based on the aforementioned operations. For example, when wireless device 130 has a high uplink usage requirement, a low power headroom, or a high mobility, and is currently attached to serving access node 110 (that is capable of uplink split mode), and wireless device 130 experiences poor RF signal conditions, the wireless device 130 is discouraged from requesting a handover to access node 120 (that does not support uplink split mode), at least until an adjusted handover threshold is reached. In other words, the wireless device 130 with a high uplink usage and/or a low power headroom is encouraged (via handover threshold adjustment) to stay attached to access node 110 capable of uplink split mode, despite RF signal conditions deteriorating beyond typical thresholds. Similarly, if wireless device 130 was attached to access node 120, it can be encouraged to request attachment to access node 110 based on handover threshold adjustments. The thresholds may be defined by a network operator and can be dynamically adjusted based on overall uplink throughput and availability of different access nodes in the heterogeneous network. For example, the handover thresholds can be adjusted to encourage or discourage the wireless device 130 to be handed over to different potential serving access nodes based on the antenna configurations of each potential serving access node.

In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device. Some example signal levels may comprise a Received Signal Strength Indicator, (RSSI), Reference Signal Received Quality (RSRQ), RSRP, or any other suitable signal level.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area 116, 126 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-4.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may be associated with many different reference points, such as N1 . . . Nxx, S1 . . . Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), control gateways (SGW-C, PGW-C, SAEGW-C), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna configurations of access nodes 110, 120, past or current uplink usage requirements and capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
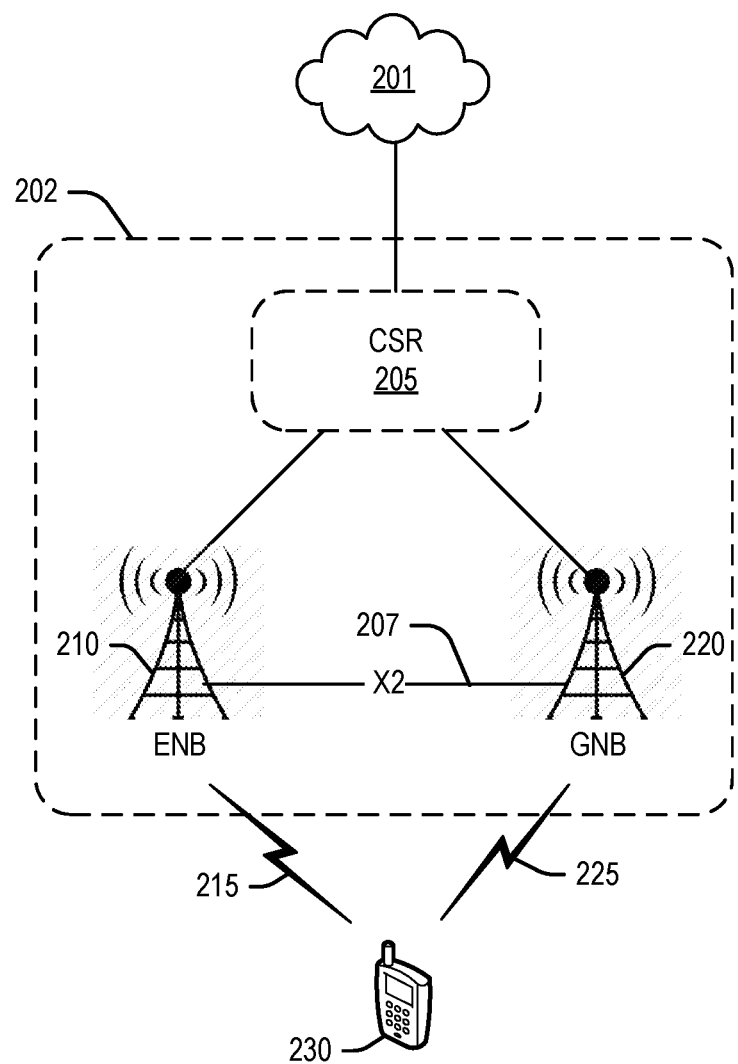
FIG. 2 depicts an exemplary 5G EN-DC radio access network.

FIG. 2 depicts an exemplary system 200 for E-UTRAN-NR Dual Connectivity (EN-DC) using 4G LTE and 5G NR. System 200 includes a communication network 201, a radio access network 202, and a wireless device 230. Radio access network further includes at least a cell site router 205, and access nodes 210, 220. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include a eNodeB (ENB), and access node 220 can include a gNodeB (GNB). For example, access node 210 can be configured to deploy a wireless air interface 215 using a first radio access technology (RAT), e.g. 4G LTE, and access node 220 can be configured to deploy a second wireless air interface 225 using a second RAT, e.g. 5G NR. Each RAT can be configured to utilize a different frequency band or sub-band, a different channel size or bandwidth, and so on. For example, the 5G NR wireless air interface 225 can be configured to utilize higher frequencies and larger channel bandwidths than the 4G LTE wireless air interface 215. Further, access nodes 210, 220 can be configured to communicate using both RATs at the same time. For example, dual connections can be set up with wireless device 230 using both 4G and 5G wireless air interfaces 215, 225 respectively, the 4G wireless air interface 215 being used to transmit control information, and the 5G wireless air interface 225 being used to transmit data information. For example, a processing node within system 200 (for example, communicatively coupled to access nodes 210, 220, or any other network node) can be configured to determine whether or not wireless device 230 is capable of communicating using both RATs, and instruct the access node 210 to broadcast an indicator in, for example, a system information message. Responsive to the indicator, wireless device 230 can attach to access node 210 which can use the 4G carrier to control and set up a dual connectivity session with wireless device 230. In other words, control information (including SIB messages) is transmitted from the access node 210 using the 4G LTE RAT, while the 5G NR RAT is utilized for transmission of data. Using the 5G RAT for data transmissions is advantageous, as 5G provides higher bandwidths and frequencies versus 4G. In addition, while different RATs offer different channel bandwidths, certain combinations of RATs may provide a greater aggregate channel bandwidth. In an exemplary embodiment utilizing multiple input multiple output (MIMO), wireless device 230 can receive a MIMO data stream using the 5G NR wireless air interface, with control signaling that enables the MIMO data stream using the 4G wireless air interface.

Further, within radio access network 202, access nodes 210 and 220 can be coupled via a direct communication link 207, which can include an X2 communication link. Access nodes 210 and 220 can communicate control and data information across X2 communication link 207. In an exemplary embodiment, access node 220 includes logic to determine how to allocate data packets between access node 210 and access node 220, wherein the data packets flow between wireless device 230 and a network node on network 201 via CSR 205. Such logic may include a packet data convergence protocol (PDCP) function. Thus, RAN 202 can include a plurality of antenna elements (not shown herein) coupled to access nodes 210 and 220, with different antenna elements configured to deploy a different wireless air interface using a different frequency. For example, each antenna element can be configured to deploy a 4G LTE wireless air interface 215 or a 5G NR wireless air interface 225. Different quantities of antenna elements can be configured to deploy (or "assigned" to) a different type of wireless air interface 215, 225, depending on the needs of a network operator or users. Further, in split mode or "concurrent mode", individual antenna elements can be configured to simultaneously deploy at least two different RATs, which enables wireless device 230 to transmit uplink data via each of the at least two wireless interfaces 215, 225 simultaneously. Thus, while access nodes that are not capable of utilizing uplink split mode may use the 4G LTE RAT for control transmissions and the 5G NR RAT for data transmissions, access nodes 210 and 220 capable of uplink split mode can receive uplink data via both 4G LTE and 5G NR RAT wireless air interfaces 215, 225. In an exemplary embodiment, the gNodeB access node 220 of RAN 202 is configured with logic to determine a transmission path for data packets traversing RAN 202. The transmission paths can traverse different RAT wireless air interfaces 215, 225, as well as different ports of CSR 205.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 and/or RAN 202 may be, comprise, or include computers systems and/or processing nodes. This includes, but is not limited to: access nodes 110, 120, 210, 220, controller node 104, and/or network 101.

Figure 3:
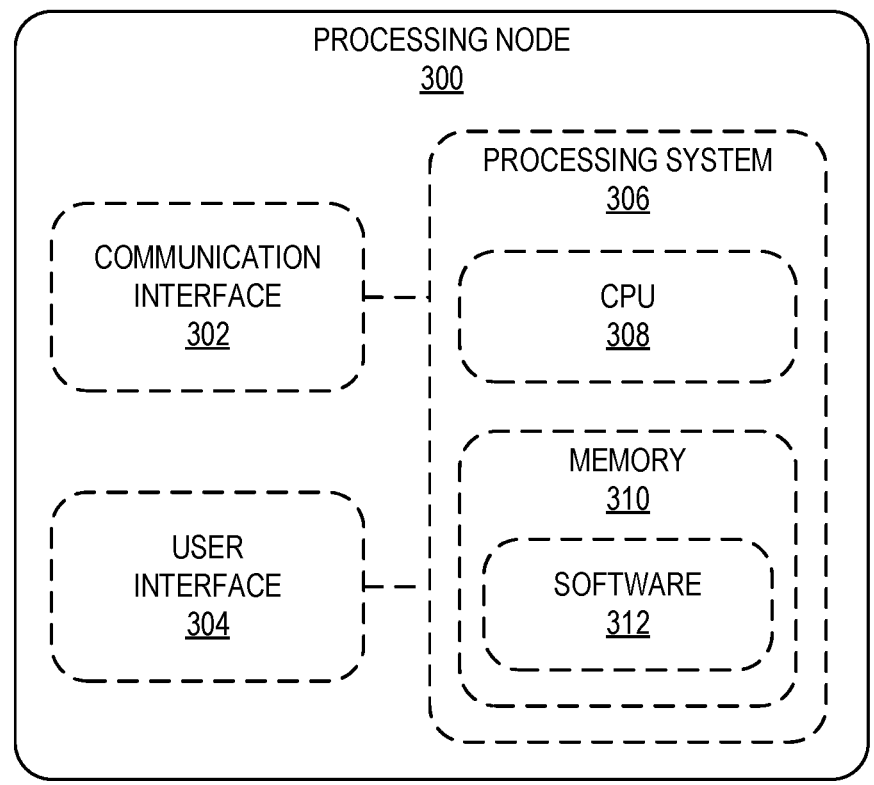
FIG. 3 depicts an exemplary processing node for selecting access nodes to ensure uplink service for wireless devices capable of uplink split mode.

FIG. 3 depicts an exemplary processing node 300. Processing node 300 comprises a communication interface 302, user interface 304, and processing system 306 in communication with communication interface 302 and user interface 304. Processing system 306 includes a central processing unit (CPU) 308, and a memory 310, which can comprise a disk drive, flash drive, memory circuitry, or other memory device. Memory 310 can store computer programs, firmware, or some other form of machine-readable instructions, including an operating system, utilities, drivers, network interfaces, applications, or some other type of software. Processing system 306 may include other circuitry to retrieve and execute software 312 from memory 310. Processing node 300 may further include other components such as a power management unit, a control interface unit, etc., which are omitted for clarity. Communication interface 302 permits processing node 300 to communicate with other network elements. User interface 304 permits the configuration and control of the operation of processing node 300.

Further, memory 310 can store a software 312, which may be executed to perform the operations described herein. In an exemplary embodiment, software 312 can include instructions for selecting a serving access node for wireless devices in a heterogeneous network by determining that a wireless device capable of utilizing uplink split mode is associated with one or more of a low power headroom, a high buffer, or a threshold mobility, and selecting the serving access node for the wireless device based on a capability of the serving access node to utilize uplink split mode. The capability of the serving access node to utilize uplink split mode can be based on the serving access node comprising a quantity of antenna elements that is either greater than a threshold quantity of antenna elements or is relatively higher than antenna elements coupled to other potential serving access nodes in the heterogeneous network.

In an exemplary embodiment, software 312 can include instructions for selecting a serving access node or ensuring uplink service by determining that a wireless device capable of utilizing uplink split mode is associated with a low power headroom, and selecting a serving access node for the wireless device that has an antenna configuration, or relatively large quantity of antennae, to support split mode.

In an exemplary embodiment, software 312 can include instructions for selecting a serving access node or ensuring uplink service by determining that a wireless device capable of utilizing uplink split mode is associated with a high buffer, and selecting a serving access node for the wireless device that has an antenna configuration, or relatively large quantity of antennae, to support split mode.

In an exemplary embodiment, software 312 can include instructions for selecting a serving access node or ensuring uplink service by determining that a wireless device capable of utilizing uplink split mode is associated with a threshold mobility, and selecting a serving access node for the wireless device that has an antenna configuration, or relatively large quantity of antennae, to support split mode.

In an exemplary embodiment, software 312 can include instructions for selecting a serving access node by adjusting handover thresholds to encourage or discourage wireless devices to be handed over to the serving access node based on the antenna configuration of the serving access node. The method includes performing a handover of split-mode capable wireless devices from a first serving access node having a relatively lower quantity of antenna elements to a second serving access node with relatively higher quantity of antenna elements.

In an exemplary embodiment, software 312 can include instructions for selecting a serving access node for a split-mode capable wireless device by determining that the split-mode capable wireless device has a mobility that exceeds a threshold, and selecting a serving access node that is capable of split mode, wherein such access nodes capable of split mode have sufficient antennae to cover a large area, thereby reducing handovers.

In an exemplary embodiment, software 312 can include instructions for ensuring uplink service by identifying a plurality of access nodes serving a common coverage area, the plurality of access nodes being capable of utilizing uplink split mode, and instructing wireless devices within the common coverage area and reporting a low power headroom and a high buffer status to attach to an access node that has a comparatively higher quantity of antenna elements relative to other access nodes from the plurality of access nodes.

Figure 4:
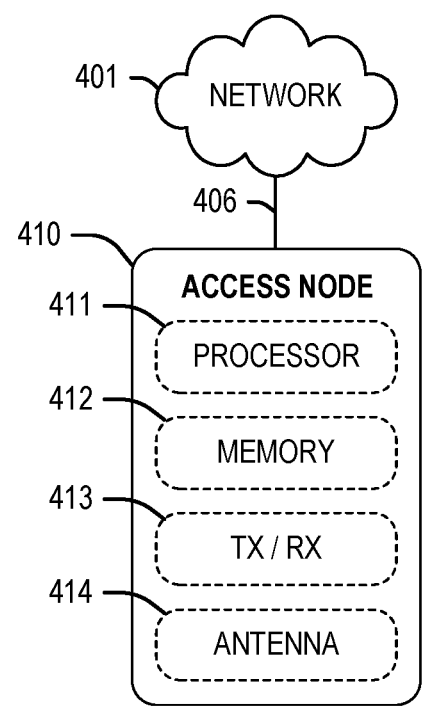
FIG. 4 depicts an exemplary access node.

FIG. 4 depicts an exemplary access node 410. Access node 410 may comprise, for example, a macro-cell access node, such as access node 110 described with reference to FIG. 1. Access node 410 is illustrated as comprising a processor 411, memory 412, a transceiver 413, and antennae 414 (hereinafter referred to as antenna elements 414). Processor 411 executes instructions stored on memory 412, and transceiver 413 (in conjunction with antenna elements 414) enable wireless communication respectively at least two wireless air interfaces, such as 4G LTE and 5G NR. For example, access node 410 may be configured to transmit control information using a first set of antennae elements 414 configured to utilize a 4G LTE RAT, and data information using a second set of antennae elements 414 configured to utilize a 5G NR RAT. Alternatively or in addition, each separate wireless air interface maintains its own control and data transmissions. Further, antenna elements 414 may include an array of antenna elements that are configured to deploy wireless air interfaces over one or more wireless sectors, form beams within these sectors, employ multiple-input-multiple-output (MIMO), etc.

Exemplary instructions stored on memory 412 can include instructions for selecting a serving access node for wireless devices in a heterogeneous network by determining that a wireless device capable of utilizing uplink split mode is associated with one or more of a low power headroom, a high buffer, or a threshold mobility, and selecting the serving access node for the wireless device based on a capability of the serving access node to utilize uplink split mode. The capability of the serving access node to utilize uplink split mode can be based on the serving access node comprising a quantity of antenna elements that is either greater than a threshold quantity of antenna elements or is relatively higher than antenna elements coupled to other potential serving access nodes in the heterogeneous network.

In an exemplary embodiment, memory 412 can include instructions for selecting a serving access node or ensuring uplink service by determining that a wireless device capable of utilizing uplink split mode is associated with a low power headroom, and selecting a serving access node for the wireless device that has an antenna configuration, or relatively large quantity of antennae, to support split mode.

In an exemplary embodiment, memory 412 can include instructions for selecting a serving access node or ensuring uplink service by determining that a wireless device capable of utilizing uplink split mode is associated with a high buffer, and selecting a serving access node for the wireless device that has an antenna configuration, or relatively large quantity of antennae, to support split mode.

In an exemplary embodiment, memory 412 can include instructions for selecting a serving access node or ensuring uplink service by determining that a wireless device capable of utilizing uplink split mode is associated with a threshold mobility, and selecting a serving access node for the wireless device that has an antenna configuration, or relatively large quantity of antennae, to support split mode.

In an exemplary embodiment, memory 412 can include instructions for selecting a serving access node by adjusting handover thresholds to encourage or discourage wireless devices to be handed over to the serving access node based on the antenna configuration of the serving access node. The method includes performing a handover of split-mode capable wireless devices from a first serving access node having a relatively lower quantity of antenna elements to a second serving access node with relatively higher quantity of antenna elements.

In an exemplary embodiment, memory 412 can include instructions for selecting a serving access node for a split-mode capable wireless device by determining that the split-mode capable wireless device has a mobility that exceeds a threshold, and selecting a serving access node that is capable of split mode, wherein such access nodes capable of split mode have sufficient antennae to cover a large area, thereby reducing handovers.

In an exemplary embodiment, memory 412 can include instructions for ensuring uplink service by identifying a plurality of access nodes serving a common coverage area, the plurality of access nodes being capable of utilizing uplink split mode, and instructing wireless devices within the common coverage area and reporting a low power headroom and a high buffer status to attach to an access node that has a comparatively higher quantity of antenna elements relative to other access nodes from the plurality of access nodes.

Figure 5:
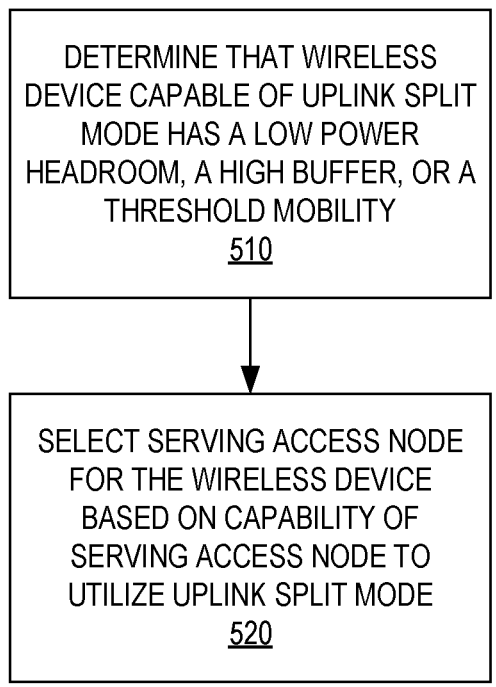
FIG. 5 depicts an exemplary method for selecting access nodes to ensure uplink service for wireless devices capable of uplink split mode.

FIG. 5 depicts an exemplary method for selecting a target access node for wireless devices with high uplink usage requirements. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that a wireless device capable of utilizing uplink split mode is associated with one or more of a low power headroom, a high buffer, or a threshold mobility, and at 520, the serving access node is selected for the wireless device based on a capability of the serving access node to utilize uplink split mode. The capability of the serving access node to utilize uplink split mode can be based on the serving access node comprising a quantity of antenna elements that is either greater than a threshold quantity of antenna elements or relatively higher than antenna elements coupled to other potential serving access nodes in the heterogeneous network.

Figure 6:
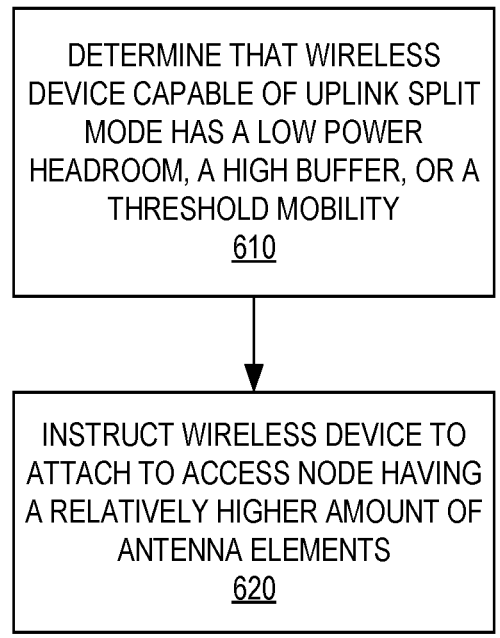
FIG. 6 depicts another exemplary method for selecting access nodes to ensure uplink service for wireless devices capable of uplink split mode.

FIG. 6 depicts an exemplary method for selecting a target access node for wireless devices with low power headroom. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a wireless device capable of utilizing uplink split mode is associated with one or more of a low power headroom, a high buffer, or a threshold mobility, and at 620, the serving access node is selected for the wireless device based on the serving access node comprising a quantity of antenna elements that is either greater than a threshold quantity of antenna elements or is relatively higher than antenna elements coupled to other potential serving access nodes in the heterogeneous network. This ensures that the serving access node is capable of utilizing uplink split mode, and sustaining adequate uplink service for the wireless device.

Figure 7:
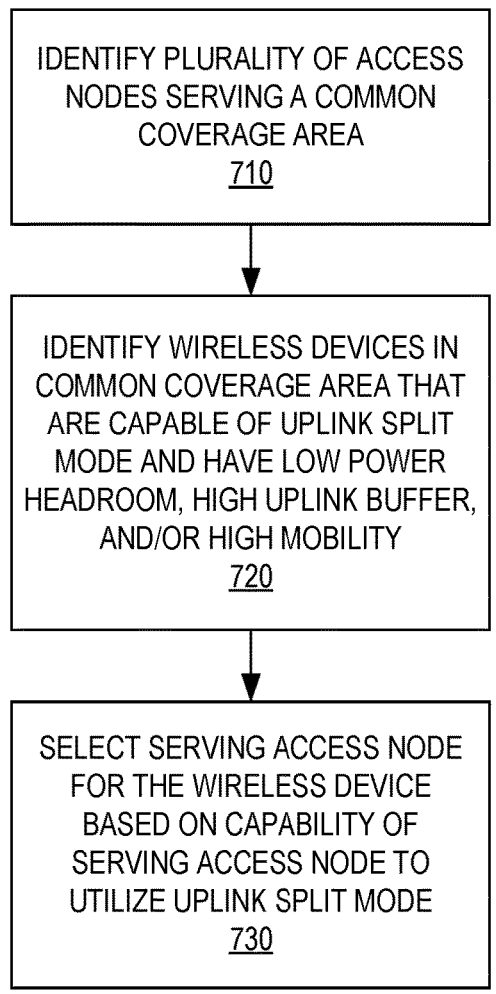
FIG. 7 depicts another exemplary method for selecting access nodes to ensure uplink service for wireless devices capable of uplink split mode.

FIG. 7 depicts an exemplary method for selecting a target access node for wireless devices with high uplink usage requirements. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a plurality of access nodes that serve a common coverage area are identified. The plurality of access nodes may include a first access node having a first quantity of antenna elements, and a second access node sharing a common coverage area with the first access node, the second access node having a second quantity of antenna elements that is higher than the first quantity of antenna elements. Thus at 720, wireless devices are identified in the common coverage area and reporting a low power headroom, a high buffer status report, or a high mobility, and at 730, such wireless devices are instructed to attach to the second access node based on the capability of the access node to utilize split mode. The capability of access nodes to utilize uplink split mode can be based on the access node comprising a quantity of antenna elements that is either greater than a threshold quantity of antenna elements or is relatively higher than antenna elements coupled to other potential serving access nodes in the heterogeneous network.

Figure 8:
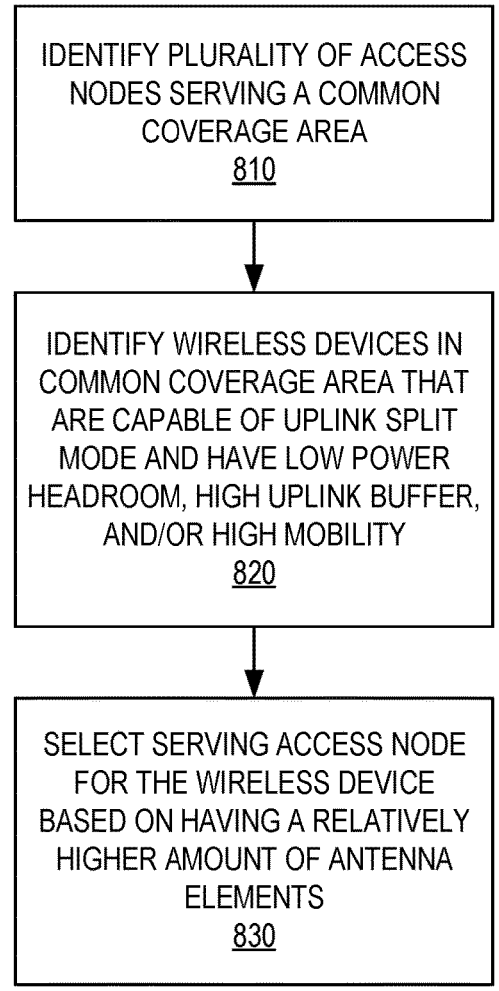
FIG. 8 depicts another exemplary method for selecting access nodes to ensure uplink service for wireless devices capable of uplink split mode.

FIG. 8 depicts an exemplary method for selecting a target access node for wireless devices with high uplink usage requirements. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a plurality of access nodes that serve a common coverage area are identified. The plurality of access nodes may include a first access node having a first quantity of antenna elements, and a second access node sharing a common coverage area with the first access node, the second access node having a second quantity of antenna elements that is higher than the first quantity of antenna elements. Thus at 820, wireless devices are identified in the common coverage area and reporting a low power headroom, a high buffer status report, or a high mobility, and at 830, such wireless devices are instructed to attach to the second access node based on a quantity of antenna elements that is either greater than a threshold quantity of antenna elements or is relatively higher than antenna elements coupled to other potential serving access nodes in the heterogeneous network. This ensures that the serving access node is capable of utilizing uplink split mode, and sustaining adequate uplink service for the wireless device.

Figure 9:
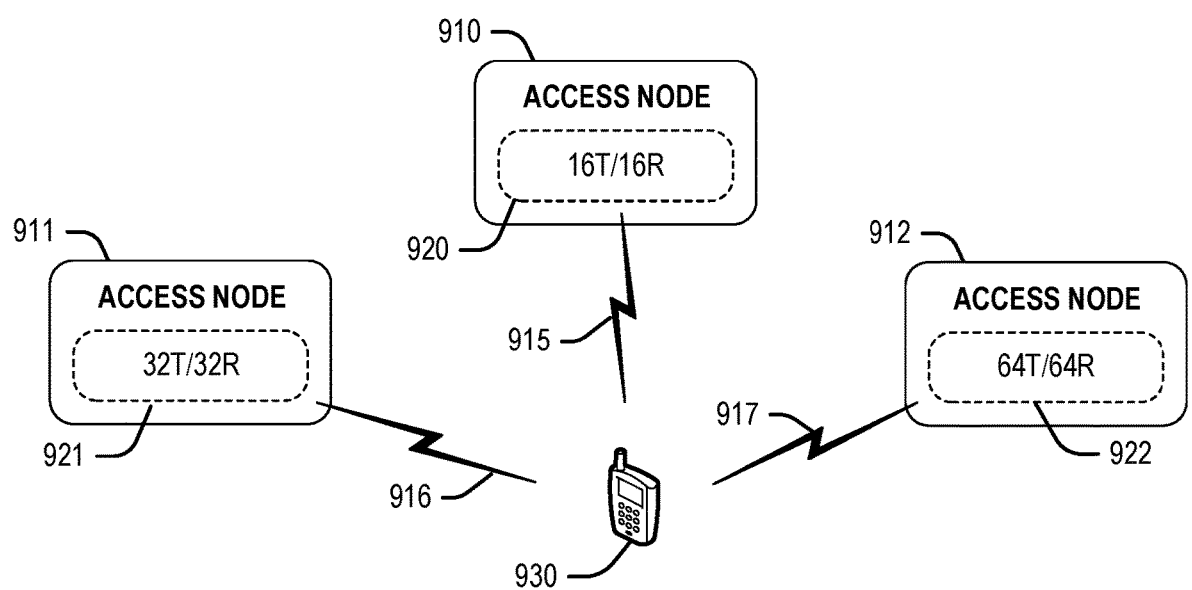
FIG. 9 depicts an exemplary embodiment for selecting a serving access node.

FIG. 9 depicts an exemplary embodiment for selecting a serving access node. In this exemplary embodiment, each of access nodes 910, 911, 912 may be configured to respectively deploy wireless air interfaces 915, 916, 917. Each wireless air interface 915, 916, 917 may be configured to utilize at least two different frequency bands or sub-bands, with different channel sizes or bandwidths, and so on. For example, each wireless air interface 915, 916, 917 can be configured to utilize both 4G LTE and 5G NR, with the 5G NR interface configured to utilize higher frequencies and larger channel bandwidths than the 4G LTE interface. Further, at least one of access nodes 910, 911, 912 can be configured to communicate using both interfaces at the same time in split mode. For example, antenna elements 922 coupled to access node 912 can be configured to simultaneously communicate using 4G LTE and 5G NR. This ability of access node 912 to utilize split mode may be based on a quantity of antenna elements 922. For example, while access node 910 is illustrated with 16T/16R antenna elements 920, and access node 911 is illustrated 32T/32R antenna elements 921, access node 912 is illustrated with 64T/64R antenna elements 922, which can enable a portion of the antenna elements 922 to be configured to utilize split mode, without negatively affecting service quality. Whereas, access nodes 910, 911 with smaller antenna configurations may be unable to utilize uplink split mode, and may only be able to utilize 5G EN-DC Further, wireless device 930 may exhibit a need or requirement for consistent uplink service, based on, for example, a high uplink buffer status, a low power headroom, or a high mobility. In an exemplary embodiment, the wireless device 930 may report an uplink buffer amount that exceeds a threshold, via for example a buffer status report (BSR). Further, the wireless device 930 may be associated with a low power headroom, determined via a power headroom report (PHR). The wireless device may be associated with a high mobility, determined via a location, or a threshold number of handover requests within a time period. In either case, a processing node communicably coupled to any of access nodes 910-912 is configured to perform operations including determining that wireless device 930 is capable of utilizing uplink split mode and is associated with one or more of a low power headroom, a high buffer, or a threshold mobility, and selecting the serving access node from among potential serving access nodes 910-912 based on a capability of the serving access node to utilize uplink split mode. The capability of the serving access nodes 910-912 to utilize uplink split mode is based on having a quantity of antenna elements that is either greater than a threshold quantity of antenna elements or is relatively higher than antenna elements coupled to other potential serving access nodes in the heterogeneous network. The threshold quantity of antenna elements comprises any one of 32×32 transmit and receive antennae (32T/32R), 64×64 transmit and receive antennae (64T/64R), or 128×128 transmit and receive antennae (128T/128R). In this exemplary embodiment, the threshold quantity of antenna elements may be 64T/64R, which results in selection of access node 912 as a serving access node for wireless device 930.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for a wireless network to select a serving access node for wireless devices in a heterogeneous network, the method comprising:
   determining that a wireless device capable of utilizing uplink split mode is associated with one or more of a low power headroom, a high buffer, or a threshold mobility; and
   selecting the serving access node for the wireless device based on a capability of the serving access node to utilize uplink split mode; wherein the capability of the serving access node to utilize uplink split mode is based on the serving access node comprising a quantity of antenna elements that is either greater than a threshold quantity of antenna elements or is relatively higher than antenna elements coupled to other potential serving access nodes in the heterogeneous network.

2. The method of claim 1, wherein the threshold quantity of antenna elements comprises any one of 32×32 transmit and receive antennae, 64×64 transmit and receive antennae, or 128×128 transmit and receive antennae.

3. The method of claim 2, wherein determining that the wireless device is associated with the high buffer is based on a buffer status report received from the wireless device.

4. The method of claim 1, wherein determining that the wireless device is associated with the low power headroom is based on a power headroom report (PHR) being below a threshold.

5. The method of claim 1, wherein determining that the wireless device is associated with the threshold mobility is based on frequency of handovers of the wireless device.

6. The method of claim 1, wherein wireless devices capable of utilizing uplink split mode are configured to transmit uplink data via at least two different radio access technologies simultaneously, and serving access nodes capable of utilizing uplink split mode are configured to receive uplink data via the at least two different radio access technologies simultaneously.

7. The method of claim 1, further comprising determining that the wireless device is in the heterogeneous network based on a combination of a master information block (MIB) message and an antenna configuration of each serving access node in the heterogeneous network.

8. The method of claim 1, wherein the wireless device is attached to a first serving access node, and selecting the serving access node comprises adjusting handover thresholds.

9. A method for a wireless network to ensure uplink service, the method comprising:
identifying a plurality of access nodes serving a common coverage area, the plurality of access nodes being capable of utilizing uplink split mode; and
instructing wireless devices within the common coverage area and reporting a low power headroom and a high buffer status to attach to an access node that has a comparatively higher quantity of antenna elements relative to other access nodes from the plurality of access nodes; wherein the capability of the serving access node to utilize uplink split mode is based on the serving access node comprising a quantity of antenna elements that is either greater than a threshold quantity of antenna elements or is relatively higher than antenna elements coupled to other potential serving access nodes in the heterogeneous network.

10. The method of claim 9, further comprising determining that the wireless device is associated with the high buffer status based on a buffer status report received from the wireless device.

11. The method of claim 9, further comprising determining that the wireless device is associated with the low power headroom based on a power headroom report (PHR) being below a threshold.

12. The method of claim 9, further comprising determining that the wireless device is associated with the threshold mobility based on frequency of handovers of the wireless device.

13. The method of claim 9, wherein wireless devices capable of utilizing uplink split mode are configured to transmit uplink data via at least two different radio access technologies simultaneously, and serving access nodes capable of utilizing uplink split mode are configured to receive uplink data via the at least two different radio access technologies simultaneously.

14. The method of claim 9, wherein the wireless device is attached to a first serving access node, and selecting the first serving access node comprises adjusting handover thresholds.

15. A system for selecting a serving access node for wireless devices in a heterogeneous network, the system comprising:
a first access node that is incapable of simultaneously receiving uplink data via at least two different radio access technologies;
a second access node adjacent to the first access node, the second access node being capable of simultaneously receiving uplink data via the at least two different radio access technologies; and
a processing node communicatively coupled to at one or both of the first and second access nodes, the processing node being configured to perform operations comprising:
identifying wireless devices within range of both first and second access nodes and being associated with a high uplink buffer or a low power headroom;
and selecting the second access node as a serving access node for the wireless devices based on the second access node being capable of simultaneously receiving uplink data via the at least two different radio access technologies; wherein the capability of the serving access node to utilize uplink split mode is based on the serving access node comprising a quantity of antenna elements that is either greater than a threshold quantity of antenna elements or is relatively higher than antenna elements coupled to other potential serving access nodes in the heterogeneous network.

16. The system of claim 15, wherein the at least two different radio access technologies comprise 4G long-term evolution (LTE) and 5G new radio (NR).

17. The system of claim 15, wherein the first access node is incapable of simultaneously receiving the uplink data via the at least two different radio access technologies based on the first access node being coupled to a quantity of antenna elements that is below a threshold quantity.

18. The system of claim 15, wherein the second access node is capable of simultaneously receiving the uplink data via the at least two different radio access technologies based on the second access node being coupled to a quantity of antenna elements that is above a threshold quantity.

19. The system of claim 15, wherein selecting the second access node comprises adjusting handover thresholds.

* * * * *